Patented Aug. 19, 1941

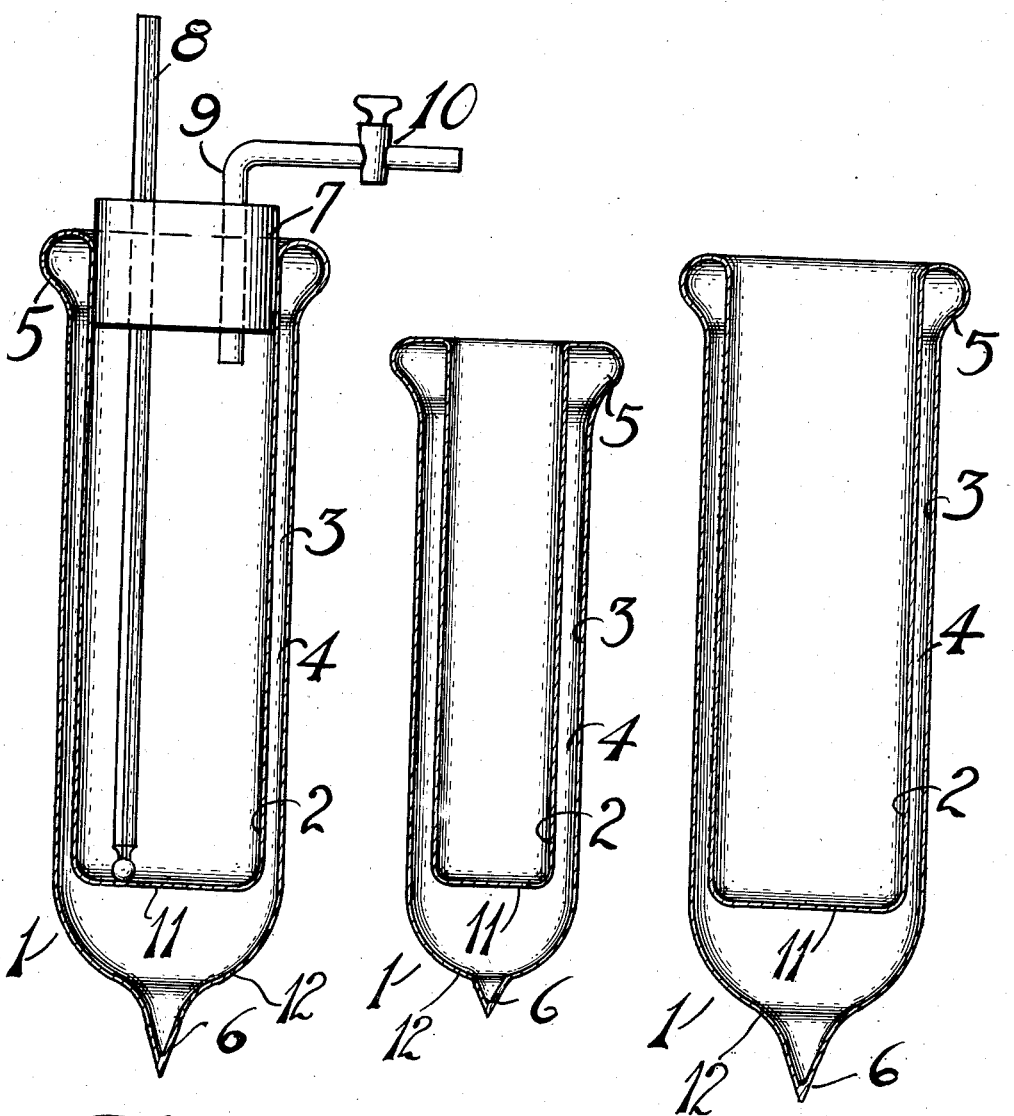

2,252,750

UNITED STATES PATENT OFFICE 2,252,750

TRANSPARENT DOUBLE WALLED JAR FOR TESTING LIQUIDS

Walter M. Basch, Westfield, N. J.

Application August 8, 1938, Serial No. 223,643

3 Claims. (Cl. 73—51)

The present invention relates primarily to equipment useful for making pour point determinations, cloud tests and freezing point tests particularly as applied to the testing of petroleum oils.

When a crude petroleum oil is distilled into different fractions such as gasoline, kerosene, gas oil, light and heavy lubrication oils, etc., it is frequently, if not almost always necessary to determine both the boiling and freezing or solidification characteristics of most of the fractions particularly the heavy ones. For instance in determining the suitability of a lubricating oil fraction for use in lubricating an automobile engine a pour point determination is necessary to find out whether the oil will remain fluid (i. e. whether it will always pour) at the lowest temperature under which the automobile will be used. In winter such a lubricating oil must obviously have a much lower pour point than in summer, for instance —10° F. in winter as compared to 30° F. in summer.

For many years, since about 1900, the recognized standard method of making a pour point test has been to place the sample of oil in a small vertical cylindrical glass jar, place the latter in a slightly larger cylindrical metal jar, using a leather ring to keep the glass jar centrally positioned within the metal jar and a cork disk on the bottom, and then immerse the latter in a liquid bath having a suitably low temperature to cool the oil down farther and farther, until the oil refuses to pour when the glass jar is tilted. Inspections are generally made every 5° as read on a thermometer which is immersed directly in the sample of oil in the glass jar. This standard test is known as the A. S. T. M. cloud and pour test D97-34. In making the test the oil is brought to a temperature of 115° F. cooled to 90° F. and then placed in a bath having a temperature of 30° F. until the oil has been cooled down to 50° F.; then it is transferred to a bath having a temperature of 0° F. until the oil is cooled down to a temperature of 20° F., then transferred to a bath having a temperature of —30° F. until the oil is cooled down to —10° F., and finally, if the pour point has not already been reached, the oil is transferred to a bath having a temperature of —60° F. until the oil is cooled down to —35° F. This is generally cold enough for all ordinary oils although for certain special aviation oils even colder baths may be required.

A serious disadvantage with the above described pour test is that frequently when the glass jar containing the oil sample is removed from the metal jar in order to tilt it to see whether the oil still pours or not the glass jar is so cold that humidity from the surrounding air immediately condenses on the glass jar and coats the entire outer surface thereof with a thin layer of frost thereby impairing the visibility of the oil sample within; furthermore if such a layer of frost is wiped off by hand the warmth from the hand is imparted to the jar and tends to soften or fluidify the layer of oil immediately adjacent to the jar thereby tending to give a false impression as to the pour characteristics of the oil. Another disadvantage of the above described pour testing equipment is that the leather ring mentioned above which is intended to keep the glass jar concentrically located within the metal jar frequently slides up or down on the glass jar and then no longer holds the glass jar in proper position and as a result some parts of the glass jar get closer to the metal jar than others and consequently some parts of the oil within the glass jar get much colder than other parts.

A still further disadvantage of the above described pour testing equipment is that each test involves the handling of at least these four pieces of equipment, namely the two jars, cork disk and the spacer ring, in addition of course to the cork and thermometer and the one or more cooling baths. The use of such a large number of pieces of equipment not only tends to consume time in making the tests themselves but requires extra time and effort in cleaning up the equipment preparatory for future tests.

It is a primary object of the present invention to avoid these and other disadvantages and to provide a single unit testing jar.

Referring to the drawing Fig. 1 shows a cross section of a jar particularly adapted for making pour and cloud tests; Fig. 2 is a cross section of a somewhat smaller jar adapted for making melting point and freezing point tests; and Fig. 3 is a cross section of a jar similar to that in Fig. 1 except that it is provided with a ground-glass stopper for purposes to be described later.

In Fig. 1 the single unit testing jar 1 is shown as consisting essentially of two concentrically positioned glass jars 2 and 3, with the intervening space 4 sealed off at the top and bottom so as to provide uniform insulation between the outer glass wall 3 which is placed in immediate contact with a cooling bath (not shown) and the inner glass wall 2 containing the oil sample to be tested. Having a flat bottom 11 on inner jar 2 and a round bottom 12 on outer jar 3 substantially as shown in the drawing, imparts to the inner jar substantially the same cooling rate on the bottom as on the sides. This double walled jar is flanged outwardly at the top 5 so as to provide means for supporting it in the cooling bath. The space 4 between the inner and outer jars is preferably evacuated although air or any other gaseous medium may be used so long as it is free from moisture or any other constituent which might condense on the surface of the glass walls to such an extent as to impair visibility. It is best to use an absolute pressure corresponding to about 0.1 mm. mercury because the greater the vacuum the slower is the cooling rate and a pressure of 0.1 mm. gives a cooling rate corresponding to that obtained with the previously used standard testing equipment described above. A series of tests made with a double walled glass cold test jar according to the present invention were made using various degrees of pressure including 0.1 mm., 1 mm., 10 mm., 100 mm., 380 mm. (½ atmosphere), and 760 mm. (atmospheric pressure).

In all of these tests dry air was used as the medium between the inner and outer glass walls of the jar. This was accomplished by providing a specially designed jar with a stopcock, (not shown) at the bottom tip 6, evacuating it to 0.1 mm. mercury, making a test with that degree vacuum, then admitting dry air through the stopcock until the vacuum was reduced to 1 mm., making the test under that condition and continuing to admit dry air at the various degrees of vacuum mentioned above. These tests indicate that with dry air at atmospheric pressure the speed of cooling is approximately 1½ times that with a vacuum of 0.1 mm. and with intermediate degrees of vacuum the speed of cooling is correspondingly intermediate.

In constructing this novel cold test jar it is preferable to use glass about $\frac{1}{16}$" thick or in any case sufficiently thick to withstand the strain due to the vacuum between the inner and outer walls of the jar. In manufacturing such a jar it is preferable to seal the inner and outer jars together at the upper end 5 before evacuating, and then soften the bottom to a tubular form to permit evacuating the jar and after the desired degree of vacuum has been obtained, sealing off the tube into a point 6.

It is obvious that this cold test jar may be made with various dimensions, although it is preferably constructed with the inner glass wall 2 having precisely the same dimensions as the glass jar called for in the previously used standard test procedure referred to above, namely 1⅜" inside diameter and 5⅛" long, and the outer wall 3 is preferably 1¾" outside diameter and about 5½" long exclusive of the pointed tip 6 at the bottom and 6½" overall. These dimensions can be varied as explained in the A. S. T. M. specifications referred to. The flange 5 at the top may protrude any desired amount but ¼" is sufficient for ordinary purposes.

A double walled jar made according to this invention can be used for making pour point determinations down to even the lowest temperatures such as −35° F. or even lower without frosting over the outer surface when the jar is taken out of the cooling bath to see whether the oil still pours or not; because even though the jar itself is far below ordinary water-freezing temperature any moisture tending to condense on its surface immediately dissolves in the wet film of the liquid which is being used as cooling bath such as, for instance ethyl alcohol or isopropyl alcohol containing "dry ice" (solidified carbon dioxide). With the unit construction described, obviously the inner glass wall 2 can never get out of proper position in respect to the outer glass wall 3 and therefore more accurate pour and cloud point determinations are possible than heretofore and these tests can be made relatively free from the effect of personal factors which frequently cause discrepancies between check tests made by a number of different testing laboratories on the same sample of oil; in other words more uniform tests results are made possible. It is also apparent that with this simple unit construction a single piece of equipment takes the place of four pieces used heretofore and consequently easier handling, cleaning and storage are facilitated.

The novel test jar described above as useful for making pour tests is even more advantageously used for cloud tests, where, upon cooling, some of the constituents of the oil tend to precipitate out in the form of fine particles which at first produce a cloudy suspension or haze in the oil at the bottom which is the coldest part and then gradually throughout the whole body of the oil.

By slight modification this glass jar may be adapted to making freezing point or melting point determinations. For this purpose as shown in Fig. 2, the inner wall 2 of the jar should have an internal diameter of about ⅝" to ⅞" in order to use less quantity of sample than in the pour and cloud test, and a length of 4" whereas the outer glass wall 3 should be 1⅜" in diameter and 4½" long exclusive of the pointed bottom tip. With such dimensions, obviously space 4 between the inner and outer walls will be wider and consequently this jar will have greater insulation and correspondingly slower speed of cooling, with resultant increase in the accuracy of freezing point determinations, or slower warming up and more accurate melting point determinations. The A. S. T. M. specifications D87–37 entitled "Melting point of paraffin waxes."

As a still other variation of the novel test jar described above, it is possible and at times desirable, as shown in Fig. 3, to fit the mouth of the jar with a ground-glass stopper 7 which in turn is fitted with a sealed in thermometer 8 and sealed in glass tube 9 provided with a stopcock 10. This arrangement permits evacuation of the inside of the double walled glass jar, and, if desirable, replacement of the air normally present therein, with any other gaseous medium such as dry air or an inert gas such as nitrogen, carbon dioxide, etc. This particular type of jar is especially adapted for making cloud tests on mineral white oils (petroleum oil fractions which have been refined by concentrated sulphuric acid) because such oils tend to absorb moisture very rapidly and this spoils the cloud tests. Such a glass-stoppered double-walled cold test jar would be suitable for making the cloud test specified in the British Pharmacopeia (1932) for "Liquid paraffin" (which corresponds to our mineral white oil). It specifies that the dried sample of white oil should not show a cloud when cooled to 0° C. and kept at that temperature for 4 hours.

It will also be apparent to those skilled in the art that this novel jar will be useful for making aniline point determinations and even various other uses.

Although it is primarily intended to make this test jar out of glass it can if desirable be made out of any suitable colorless transparent material such as a thick walled "Cellophane" (regenerated cellulose) or a colorless transparent plastic or resinous product—providing such materials are used in conjunction with a cooling bath which does not dissolve or impair the visibility of the material of which the testing jar is made.

Although the novel double walled cold test jar described above bears a similarity to the Dewar flask and the common thermos bottle in that these latter two articles both have a double wall and an evacuated insulating space therebetween, yet both of them have been provided with a metallic reflecting surface in order to reflect exterior heat waves and are used for entirely different purposes, and although both of them have been known for very many years no one has suspected that the advantageous features of the evacuated double walled glass jar construction could be adapted as explained hereinabove according to the present invention to make a cold test jar greatly superior to that which likewise in its field has been known and used for many years.

It is not intended that this invention be limited to the particular embodiments or dimensions shown nor by any of the disclosures which were given merely as illustrative, but only by the appended claims in which it is intended to claim all novelty in the invention as broadly as the prior art admits.

I claim:

1. Testing apparatus, adapted to make pour, cloud, melting point and freezing point tests on oils, comprising a transparent double walled cylindrical jar made of colorless, transparent material, closed at the bottom and open at the top, the cylindrical sides of the inner wall being in equidistant spaced relation to the cylindrical sides of the outer wall at all points, and the inner wall being sealed over to the outer wall at the top, whereby the space between the inner and outer walls provides insulation against heat transfer between said walls, the outer wall being bulged outwardly at the top so as to provide a flange adapted to support the jar in a vertical hanging position, the space between the walls of said jar being substantially entirely free from moisture or any other fluid material which might, on cooling down to a temperature as low as $-60°$ F., tend to condense on the walls and impair their transparency the space between said walls also being evacuated to an absolute pressure of about 0.1 mm. mercury so as to give a cooling rate substantially corresponding to that of the A. S. T. M. for such testing apparatus.

2. Apparatus according to claim 1, in which the inner wall member has a flat bottom and the outer wall member has a round bottom, whereby the inner jar has substantially the same cooling rate on the bottom as on the sides.

3. Testing apparatus, adapted to make pour and cloud tests on oils, comprising a transparent double walled cylindrical glass jar, closed at the bottom and open at the top, the cylindrical sides of the inner wall being in equidistant spaced relation to the cylindrical sides of the outer wall at the top, whereby the space between the inner and outer walls provides insulation against heat transfer between said walls, the outer wall being bulged outwardly at the top so as to provide a flange adapted to support the jar in a vertical hanging position, the inner wall member having a flat bottom, the outer wall member having a pointed round bottom as a result of being drawn out and sealed while soft, the inner wall being 1"–1½" in diameter and having a length about three times its diameter the space between the walls being about ⅛"–¼", and being evacuated to an absolute pressure of about 0.1 mm. mercury so as to give a cooling rate substantially corresponding to that of the A. S. T. M. for such testing apparatus and being substantially entirely free from moisture or any other fluid material which might on cooling down to a temperature as low as $-60°$ F. tend to condense on the walls and impair their transparency.

WALTER M. BASCH.